United States Patent [19]
Goodell

[11] 3,928,235
[45] Dec. 23, 1975

[54] CATALYST FOR PURIFICATION OF WASTE STREAMS

[75] Inventor: Paul Douglas Goodell, Ridgewood, N.J.

[73] Assignee: The International Nickel Company, Inc., New York, N.Y.

[22] Filed: Nov. 12, 1973

[21] Appl. No.: 411,692

[52] U.S. Cl. ............... 252/458; 252/462; 252/465; 252/467; 252/469; 252/470; 423/213.2; 423/213.5
[51] Int. Cl. .................. B01j 11/06; B01j 11/22
[58] Field of Search .......... 252/467, 470, 458, 462, 252/465, 469; 423/213.2, 213.5

[56] References Cited
UNITED STATES PATENTS

| | | | |
|---|---|---|---|
| 1,168,074 | 1/1916 | Hunter | 75/171 |
| 1,175,724 | 3/1916 | Driver | 75/170 |
| 1,393,375 | 10/1921 | Hunter | 136/241 |
| 1,992,325 | 2/1935 | Schaarwachter | 148/11.5 |
| 2,761,778 | 9/1956 | Mann | 75/171 |
| 2,780,638 | 2/1957 | Ayers et al. | 252/470 X |
| 2,968,550 | 1/1961 | Eash | 75/171 |
| 3,565,574 | 2/1971 | Kearby et al. | 252/474 X |
| 3,591,362 | 7/1971 | Benjamin | 75/.5 BA |

OTHER PUBLICATIONS
Meijering et al., A Miscibility Gap in the Face–Centered Cubic Phase of the Copper–Nickel–Chromium System, J. Institute of Metals, Vol. 84, pp. 118–120 (1955–56).

*Primary Examiner*—W. J. Shine
*Attorney, Agent, or Firm*—M. W. Leff; E. C. MacQueen

[57] ABSTRACT

A high temperature catalyst comprised of an oxidation resistance alloy containing chromium and copper is provided by a powder metallurgy technique to obtain an alloy system characterized by uniformity and by a fine dispersion of heterogeneities which tend to exist in such system. A material developed from an alloy powder consisting essentially of chromium, copper, and nickel is especially useful for purification of waste streams containing nitrogen oxides.

29 Claims, 6 Drawing Figures

CATALYST FOR PURIFICATION OF WASTE STREAMS

BACKGROUND OF THE INVENTION

1. Field of the Invention

This invention relates to a catalyst which is useful for converting harmful constituents, such as organic compounds, carbon monoxide and nitrogen oxides, in gaseous waste streams to a non-objectionable form before emission to the environment. The waste streams containing such noxious constituents may be, for example, exhaust gases from industrial processes or motor vehicles.

In recent years considerable attention has been focused on the problem of air pollution abatement. Among the gaseous contaminants most prevalent in the air are carbon monoxide, hydrocarbons, and nitrogen oxides, each of which presents special problems. Nitrogen oxides, for example, are harmful directly, in that they are toxic to plants and animals, and indirectly in that they participate in the formation of smog. Generally, nitrogen oxides, referred to herein as $NO_x$, are produced when fossil fuels, e.g., coal, fuel oil, natural gas are burned in air, and the major contributors to $NO_x$-pollution are waste streams of many industrial furnaces, electric utilities, and exhaust gases from internal combustion engines. Of these, the automobile is a significant source of the $NO_x$ in the air, and at present it is considered especially difficult to handle the $NO_x$ in automobile exhaust streams.

Automobile exhaust streams contain CO and unburned or partially burned hydrocarbons in addition to $NO_x$ (which is present mainly as NO and $NO_2$) as the principal gaseous air-polluting constituents. The composition temperature and pressure of the exhaust stream depend on many and complex factors such as engine design, age of the automobile, driving mode, fuel, and air/fuel ratio. $NO_x$ formation is favored at higher temperatures when the automobile is operated at high speed, high load, and at near stoichiometric air-fuel ratios. Hence $NO_x$ build-up in the exhaust occurs during cruising and accelerating modes. Running the engine fuel-rich, fuel-lean and/or recycle of the exhaust tend to reduce the $NO_x$ content, but these techniques increase the concentration of CO and/or hydrocarbons. A further complicating factor is that the gas stream is highly complex and at high temperatures and high $NO_x$ concentrations a large number of reactions may take place. Catalytic conversion is one of the techniques used to reduce the undesirable gaseous constituents in the exhaust, and many catalysts and catalytic devices which contain one or more beds have been proposed for this purpose.

This invention concerns catalysts which can be used, generally, in high temperature reactions including the reduction of $NO_x$ from waste streams from any source. The present catalysts can further be used for the oxidation of CO and hydrocarbons, making them particularly useful for the purification of automobile exhaust. For this reason and for convenience, the present invention is described with particular reference to automobile exhaust purification.

2 Description of Prior Art

Many catalysts are known which are highly active for the reduction of $NO_x$. To be useful for the purification of automobile exhaust, a catalyst must not only be capable of converting $NO_x$, but the conversion must be to a form which is not harmful and cannot be reconverted into a noxious material. Moreover, the catalyst must meet stringent requirements of high activity and selectivity while maintaining good chemical and mechanical stability under extremely adverse conditions.

Numerous catalysts, catalytic devices, and catalytic systems containing one or more catalytic beds have been proposed for the purification of automotive exhaust gases. Published materials in this field show that research in this area has been intensive and literally hundreds of catalysts have been tested. Among the many patents and publications relating to catalysts for removal of $NO_x$ from exhaust streams are U.S. Pat. Nos. 3,398,101; 3,565,574; 3,669,906; 3,674,423, and SAE Reports Nos. 720,480 (May, 1972), 720,209 (January, 1972), 710,291 and 710,014 (January, 1971), publications of the Society of Automotive Engineers. The reported catalysts include supported and unsupported base and noble metals, oxides, and mixtures of oxides. Among the promising catalysts are those containing chromium, copper, nickel, or their oxides and combinations thereof. For example, exides of nickel, copper and chromium, and various combinations, such as mixtures of copper oxide and chromium oxide, have been deposited on refractory oxides. Unsupported copper and copper chromites have been tried. Copper-plated stainless steel and alloys such as nickel-copper, and nickel-chromium-iron alloys have been suggested. Supported and unsupported nickel-copper alloys have been specifically proposed as $NO_x$ removal catalysts for a first stage $NO_x$ reduction in a duel-bed automotive exhaust converter. It is known that the method of preparation as well as the composition plays a material part in the ultimate performance of the catalyst in the exhaust purification system, and many methods of preparation have been proposed. Typically, the copper, nickel, and chromium catalysts for $NO_x$ removal have been produced as supported or unsupported materials by steps including precipitating or coprecipitating metals or their oxides from a solution thermally, chemically or electrically. Alloys used as catalysts have been formed by the usual metallurgical melting, casting and working techniques. Despite vast research efforts expended in this field, to date no catalyst has been found which is entirely satisfactory for $NO_x$ removal from auto exhaust. The principal problems are poor mechanical integrity and/or loss of catalytic activity.

It is the object of the present invention to provide a catalyst which has good chemical and mechanical stability at high temperatures.

Another object is to provide a catalyst for the conversion of $NO_x$ which is present in a waste stream to a non-objectionable product.

It is still another object to provide a catalyst which is compatible with automotive exhaust streams, is effective for removing $NO_x$ from exhaust streams at typical automotive exhaust temperatures, is selective under these conditions for the reduction of $NO_x$ to $N_2$, and is active for removing CO and hydrocarbons as well as $NO_x$ from such streams.

A further object is to provide a catalyst which is effective for $NO_x$ reduction in a single or multi-bed catalytic converter for automobile exhaust systems.

These and other objects are achieved with the catalyst of the present invention, as will be illustrated by the following description and examples and by the accompanying drawings.

SUMMARY OF THE INVENTION

Briefly, in accordance with this invention a catalyst is provided which is especially useful for high temperature reactions. The catalyst is a material comprised of an alloy containing chromium and copper, e.g., consisting essentially of chromium and copper or of chromium, nickel and copper. The alloy contains at least about 5 percent chromium, is close to full theoretical density, and it is characterized by a uniform microstructure which is substantially free of optically observable heterogeneities of a size greater than about 20 microns, and preferable free of heterogeneities of a size greater than about 10 or 15 microns. The material may be single or multi-phase. The multi-phase material is further characterized in that the distance between heterogeneities is no greater than about 20 microns, and preferably it is less than about 10 or 15 microns.

The terms heterogeneity and theoretical density are used herein as follows: Heterogeneity refers to a region or area in the alloy which is compositionally or structurally different from the matrix phase. For example, one or more phases may exist in the alloy which are different in composition or structure from the average or bulk characteristics of the alloy. The different phases and different compositions of the same phase which may be present are explained in more detail below. However, the alloys of this invention are characterized in that if such heterogeneities are present they are finely and uniformly dispersed throughout the structure. Theoretical density of an alloy is the maximum possible density for the given composition and phase distribution.

In one feature of this invention the chromium and copper-containing alloy of uniform composition is prepared as a powder by a powder metallurgy technique which will give the desired uniform microstructure and density, and the alloy, which may first be formed into aa macrostructure, is treated at an elevated temperature in a gas phase atmosphere which is oxygenating with respect to said alloy to develop an oxidation-resistant, stratified, catalytically active surface on the alloy. It will be noted that the components of the alloy may be present at the surface of the catalytic material as elemental metals, compounds such as oxides, salts, alloys, or mixtures thereof.

In another feature of this invention the catalyst is a composition comprised of an alloy of chromium, nickel and copper which is prepared by a method comprising a powder metallurgy step to obtain a high density microstructurally uniform alloy powder. Alloys formed in this manner and having the chromium, nickel and copper composition, falling within the boundaries A-B-C-D-E-A, and preferably F-G-H-I-F of FIG. 1 have high activity and selectivity for the reduction of $NO_x$ to $N_2$, and they exhibit mechanical and chemical stability and in addition they are effective for the oxidation of CO and hydrocarbons.

DESCRIPTION OF PREFERRED EMBODIMENTS
COMPOSITION

The catalyst is a material comprised of an alloy containing chromium and copper, e.g., the alloy may consist essentially of chromium and copper, or of chromium, nickel and copper.

In a preferred embodiment of this invention the catalyst, which is especially useful for purifying gas streams containing $NO_x$ and CO is an alloy and/or developed from an alloy of chromium, nickel, and copper. During the reaction at the surface the component metals of the alloy may be present in metallic form and/or as one or more oxides, for example cuprous chromite ($Cu_2Cr_2O_4$), cupric chromite ($CuCr_2O_4$), cuprous oxide $Cu_2O$, cupric oxide, (CuO), nickel oxide (NiO), and chromic oxide ($Cr_2O_3$). In terms of the metallic components, the composition preferably falls within the area defined by the letters A-B-C-D-E-A, and more preferably F-G-H-I-F of the accompanying FIG. 1. It will be noted that the nickel and chromium composition must be correlated, i.e., where the chromium concentration is as low as about 5 percent the nickel content must be accordingly, greater than about 45 percent. Typically, and within the bounds of the above proviso, the alloys may contain about 15 to about 45 percent chromium, about 10 to about 60 percent nickel, and about 15 to about 70 percent copper.

Figure 1:
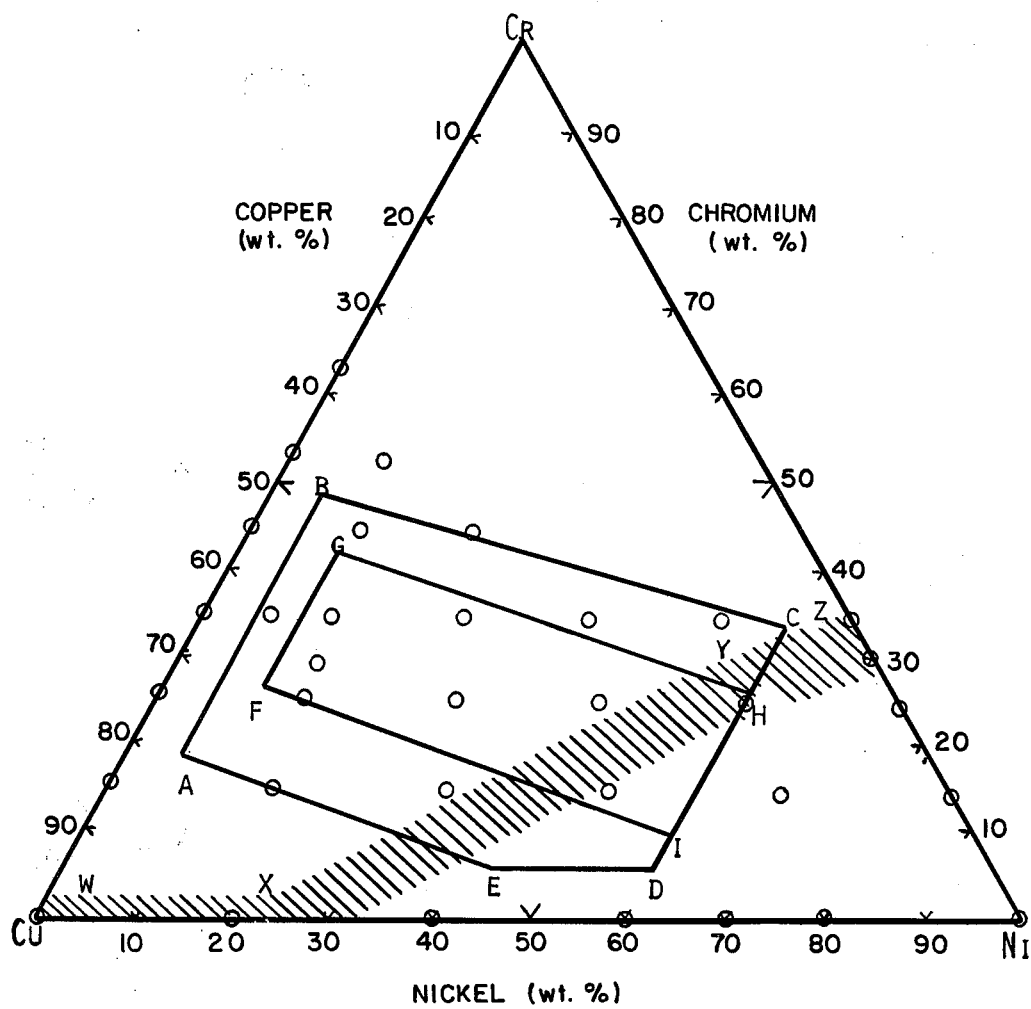
FIG. 1 is a diagrammatic representation, showing the chromium-nickel-copper alloy compositions on a metal component basis which are effective for selectively reducing $NO_x$, the preferred compositions falling within the area defined by A-B-C-D-E-A and the more preferred compositions within the area defined by F-G-H-I-F.

Preferred alloys are comprised of about 25 to about 35 percent chromium at nickel levels between about 5 and 25 or 30 percent, and about 15 to about 25 percent chromium at nickel levels between about 25 and 60 percent, and the balance copper. At a chromium level of about 15 percent or less (and a nickel concentration of about 30 percent or less) the catalyst will not withstand the exhaust environment in that it is not sufficiently oxidation resistant. The minimum chromium level is about 5 percent provided the nickel level is above about 45 percent. Above a chromium level of about 45 percent at a nickel level above about 10 percent the material does not exhibit sufficient catalytic activity. It is believed that at high chromium levels the chromium tends to migrate to the surface under oxidizing conditions. This condition is somewhat mitigated by decreasing the nickel content. Thus, the chromium and nickel levels are correlated, as shown in FIG. 1.

MICROSTRUCTURE OF CATALYSTS

The term catalyst, as used herein, includes the precursor materials such as the alloy powders which are used to form the catalytic structures as well as the active materials containing various oxides developed from such alloys.

The precursor powders are dense, preferably at least about 80 or 90 percent of full theoretical density, and characterized by a uniform microstructure. Heterogeneities when present are fine and uniformly distributed. As noted previously, the alloys contain at least two immiscible metals, e.g., chromium and copper, and may have one or more phases or phase compositions depending on the presence of additional elements and their concentrations. In other words, the alloys of this invention are normally subject to compositional and/or phase separation into coarse or inhomogeneous components. This occurs, for example, if the alloys consist only of chromium and copper which are essentially immiscible, or if the alloys consist of chromium, copper and nickel. In the Cr—Ni—Cu alloys having a high level of nickel there is a tendency to phase and/or composition separation due to segregation and coring. This inhomogeneous separation when coarse can be particularly undesirable where the separate phases and/or compositions in the alloy exhibit widely different properties, for example with respect to deformation or oxidation resistance. However, when prepared according to the method of the present invention the composition of the phases show only relatively small deviations from equilibrium. Thus, if an alloy can be single phase, such as the high nickel-containing alloys, according to the present invention the alloy will be substantially single phase and any other phase which may appear, e.g., due to segregation or coring will be minimized and distributed uniformly and finely throughout the alloy. Such heterogeneities in the single phase system are no greater than about 20 microns. Where the alloy composition has a minimum of two or more phases, the microstructure is characterized by a matrix phase and the uniform and fine distribution of the dispersed phase or phases (also referred to as heterogeneities) throughout the structure. In the chromium-nickel-copper system of this invention shown in FIG. 1, the cross-hatched area W-X-Y-Z represents the approximate boundary between the materials forming more than one phase (viz. on the left of W-X-Y-Z), and those in which only a single phase may be present (viz. on the right of W-X-Y-Z).

The principal metallic phases which may exist in the chromium-nickel-copper alloys of this invention are:

Gamma one: a copper-rich face-centered cubic phase.

Alpha: a chromium-rich body-centered cubic phase.

Gamma two: a nickel-rich face-centered cubic phase.

In the alloys of this invention containing a minimum of two phases, the microstructure consists essentially of a copper-rich substantially continuous matrix and a discontinuous chromium-rich phase essentially uniformly dispersed therein. This microstructure is illustrated for the alloy 35Cr—13Ni—52Cu in FIG. 2a. The distribution of the uniformly dispersed alpha phase is such that the average distance between the heterogeneities is no greater than about 10 or 20 microns.

With respect to heterogeneities of the order of magnitude of about 20 microns or greater, these can be optically observed at 100x magnification. Typically, in alloys of this invention the heterogeneities are of a size less than about 10 or 12 microns and are observable at a magnification of 1000x.

CATALYST PREPARATION

In accordance with this invention, catalysts especially suitable for use at high temperatures are produced by a method comprising: (a) providing an alloy in the form of a powder comprised of (1) copper and chromium and (2) copper, chromium and nickel said alloy being or capable of being on heat treatment either: (A) substantially a single phase system substantially free of heterogeneities of a size greater than about 20 microns, or (B) a multi-phase system having a matrix phase and heterogeneities consisting essentially of at least one phase different from the matrix phase distributed in such structure, the heterogeneities being no greater in size than about 20 microns and the average distance between such heterogeneities being less than about 20 microns, and (b) treating the alloy at an elevated temperature in a gas phase atmosphere which is oxygenating with respect to said alloy to develop an oxidation resistant, stratified, catalytically active surface on the alloy.

The expression "for catalytic use at high temperatures" as used herein refers to temperatures of the order of about 500° to about 1,800°F.

It will be noted that for certain applications, e.g., for use as an automotive exhaust catalyst, the alloy powders are formed into shaped macrostructure, and the resultant macrostructure is heat treated according to step $b$ to develop the stratified catalytically active surface on the macrostructure.

As known to those skilled in powder metallurgy techniques, certain methods of preparation will tend to produce alloys powders of the type described above. Included in such methods are mechanical alloying, atomization, splat cooling, plasma or flame spraying. Very fine dry powders of elemental metals, e.g., less than about 10 microns, may be blended and diffused to form alloys having a uniform microstructure. However, this fine powder blend method is not as satisfactory from a point of view of cost or quality of alloys, or flexibility in composition as those produced by e.g., mechanical alloying or atomization. Apart from forming alloys having the desired compositions and microstructure, certain of the powder metallurgy techniques have the additional advantage that they permit incorporation into the catalyst materials a broad range of ingredients which may serve to enhance the physical or catalytic characteristics of the composition. Consequently, it is possible to improve, e.g., durability, catalytic activity and/or selectivity by incorporation of suitable additives.

Preferably, the alloys are first produced as a dry powder by a powder metallurgy technique. For example, one method by which suitable alloys can be prepared is by a mechanical alloying technique such as described in U.S. Pat. No. 3,591,362. The alloy powder is formed into a shaped material and treated at an elevated temperature. These steps may be performed simultaneously, e.g., by a hot consolidation treatment such as hot extrusion or isostatic compaction, to develop the proper equilibrium phase distribution and density in the alloy. Generally, temperatures of about 1,500° to about 2,000°F are required for consolidation. Typically With respect to the nickel content, at least about 5 percent nickel must be present, otherwise the NH₃ formation is too high. When the nickel content is greater than about 30 percent at a chromium level of about 35 percent or greater, the material tends to show little catalytic activity, apparently due to the predominance of chromia formation. It will be noted that commercial nickel-copper alloys, i.e., alloys composed nominally of about 30Cu—70Ni, have suitable activity; however, they are not especially durable in the exhaust environment. In any event, the nickel concentration in the Cr—Ni—Cu catalysts of this invention may range from about 5 to about 60 percent, within the relationships shown in FIG. 1.

The copper concentration is typically from about 30 to about 65 percent. At a copper concentration greater than about 65 percent, the copper oxides formed at the surface tends to make the catalytic material formed at the surface non-adherent. At a copper concentration below about 30 percent, and a chromium level of about 35 percent the catalyst is not sufficiently active. It has been found that Ni—Cr catalysts, which contain no copper have little activity for the reduction of $NO_x$, except under very reducing conditions.

Thus according to one aspect of this invention an alloy is provided having a Cr—Ni—Cu composition which consists essentially of about 5 percent to about 50 chromium, about 5 to about 60 percent nickel and the balance essentially copper, provided the chromium, nickel and copper components are correlated such that the upper limit of chromium concentration is defined, in weight percent, by $Cr = 50 - 0.286Ni$, preferably $45 - 0.333 Ni$, and the lower limit of chromium concentration is defined by $Cr = 20 - 0.333Ni$, preferably $29 - 0.333 Ni$.

Compositions having a relatively high level of chromium, which fall within the alloys of this invention and which consist essentially of about 15 to about 50 percent chromium, less than about 25 percent nickel and the balance essentially copper, are essentially two phase systems. Exemplary of such compositions is the alloy consisting essentially of about 35 percent chromium, about 13 percent nickel and the balance essentially copper. Compositions falling within such a two phase system exhibit more stability with respect to heterogeneities which exist therein. That is, there is a lower tendency to phase and compositional rearrangement with time and temperature than in the single or three phase or high nickel two phase systems.

Single phase compositions, i.e., those which fall to the right of the boundary W-X-Y-Z of FIG. 1 are relatively nickel-rich. The single phase materials which have a relatively low chromium content, i.e., about 5 to about 15 or 20 percent, are characteristically more easily fabricated than those having higher chromium contents. Thus, although not preferred, it is possible that the single phase alloys, illustrated by an alloy consisting essentially of about 15 percent chromium, about 50 percent nickel, and the balance essentially copper may be prepared as a wrought material.

It will be noted that in addition to these essential components, i.e. Cr, Ni and Cu, various elements or compounds thereof may be present either for special effects or without a deleterious effect on their catalyst performance or durability. For example, in addition to Cr, Ni and Cu, the present catalysts may contain minor amounts e.g. up to about 3 or 5 percent each and preferably no greater than 10 percent total, of La, Y, Ce, Ba, Ag, Pt, Ru, Pd, Ir, Li, Pb, V, Sn, Si or compounds thereof. Also, certain metals may be substituted for a part of the essential components. For example, up to about 15 percent iron, e.g., 5 or 12 percent iron, may be substituted for a part of the chromium or copper. Other additives which may be present, e.g., up to about 10 percent, are cobalt, manganese, and molybdenum. It will be appreciated that iron may be introduced into the material to make the alloy less costly by using ferrochrome since ferrochrome is considerably less expensive than pure chromium. Cobalt may be included as an agent to increase activity of alloys of the higher chromium-lower copper content. Manganese may be useful where the catalyst is used mainly as an oxidation catalyst to increase the oxidation-resistance of the material. The total iron, cobalt, manganese, and molybdenum content will preferably not exceed about 20 percent.

Alloys exemplary of those which may be used in accordance with this invention for $NO_x$ removal are shown in Table I.

TABLE I

| | Composition (Weight %) | | | |
|---|---|---|---|---|
| Alloy | Cr | Ni | Other | Cu |
| 1 | 15 | 50 | — | Bal. |
| 2 | 25 | 15 | — | Bal. |
| 3 | 25 | 30 | — | Bal. |
| 4 | 35 | 13 | — | Bal. |
| 5 | 35 | 26 | — | Bal. |
| 6 | 45 | 11 | — | Bal. |
| 7 | 30 | 13 | 5 Fe | Bal. |
| 8 | 23 | 13 | 12 Fe | Bal. |
| 9 | 34 | 13 | 1 Co | Bal. |
| 10 | 25 | 43 | — | Bal. |
| 11 | 15 | 34 | — | Bal. |
| 12 | 25 | 45 | — | Bal. |
| 13 | 25 | 15 | 1 La₂O₃ | Bal. |
| 14 | 15 | 50 | 0.5 Y₂O₃ | Bal. |
| 15 | 45 | 11 | 1 Pb₃O₄ | Bal. |
| 16 | 35 | 13 | 1 Pd | Bal. |
| 17 | 35 | 13 | 1 Ba | Bal. |
| 18 | 30 | 14 | 1 BaO | Bal. |
| 19 | 35 | 13 | 5 Mn | Bal. |
| 20 | 45 | 11 | 0.5 Li₂O | Bal. |
| 21 | 25 | 30 | 1 Misch Metal | Bal. |
| 22 | 32 | 13 | 3 Co | Bal. |
| 23 | 35 | 12 | 15 Fe | Bal. |
| 24 | 35 | 12 | 15 Fe 1 Misch Metal | Bal. |
| 25 | 18 | 48 | 6 Fe | Bal. |
| 26 | 25 | 50 | 5 Co | Bal. |

The components of the alloys in TABLE I, as in all other alloy compositions described herein, are given in weight percent.

As will be explained below, it appears that in use, the surface of the catalyst, typically to a depth of about 0.0005 to about 0.002 inch, is at least partially oxidized and the oxides present may participate in the performance of the catalyst. It is possible to add a portion of the catalyst as an oxide in the initial step because of the unique method of preparation of these catalysts. A purpose of adding some chromium as $Cr_2O_3$ powder, for example, is to lower the cost of the catalyst and in some cases to avoid harmful redistribution of components of the alloy.

extrusion consolidation is effected by extrusion of powder held in a container, e.g., a steel container, and at a temperature in the range of about 1,500° to 2,050°F (816° to 1,121°C), depending on the alloy composition, with an extrusion ratio of about 10 : 1 to 90 : 1, e.g., 80 : 1.

Accordingly, a mixture of fine powders of chromium, nickel and copper, having a particle size of about 1 to 200 microns is subjected to repeated application of compressive forces, for example by agitation milling, under dry conditions, in the presence of attritive elements, and maintained kinetically in a highly active state of relative motion in a protective atmosphere, the dry milling being continued for a time sufficient to cause the constituents to comminute and bond or weld together throughout the resulting metal matrix of the product powders. This occurs when the mechanically alloyed powder particles reach substantially the saturation hardness level. The mechanical alloy produced in the manner is characterized metallographically by a cohesive internal structure in which the constituents are intimately united to provide an interspersion of comminuted fragments of the starting constituents.

The chromium-nickel-copper alloy powders prepared by such mechanical alloying technique may be further processed, e.g., by extrusion consolidation, as described above. The microstructure of the resultant alloy is characterized by its uniformity and the fineness of any dispersed phase which may be present.

The consolidated chromium-nickel-copper alloys may then be fabricated in the form of macroparticles, such as pellets, chips, spheres, and in some cases rods, wire, sheet and screen, which are the precursor alloy material from which the active catalysts are developed. As shown in co-pending application Ser. No. 411,691, filed Nov. 12, 1973, the alloy may be deposited on a structural support. It is a major advantage of the method of preparation of this invention that metal compounds can be readily incorporated in the alloy.

Alternatively, precursor alloys having the essential uniform and dense microstructure described above can be provided by a powder metallurgy technique known as atomization. Generally, in this method a melt of the metals is fed at a controlled rate through a nozzle of given dimensions and the stream of metal is fragmented into very small droplets with a fluid jet stream such as argon or water. The chromium-nickel-copper alloy powders, formed by gas-atomization may be fabricated into a structure of a desired shape.

To develop a durable, active, stratified catalytic surface, the precursor alloy, preferably in the form of a shaped material, is heated in an atmosphere which is oxygenating with respect to the alloy. Suitably the atmosphere contains free oxygen, for example, the atmosphere may be air, air containing up to about 10 percent moisture, or a nitrogen stream containing oxygen. However, it has been found that the active catalyst may be developed in-situ, e.g., in the exhaust stream itself where the NO, $CO_2$ or $H_2O$ may supply the oxygen needed to form the combination of oxides and/or metal at the surface of the alloy which is active and resistant to further oxidation. Thus, although stoichiometrically reducing in respect to the CO, the stream may be oxidizing with respect to constituents of the precursor alloys. The temperature for developing the catalytic surface may range from about 1,100° to about 1,900°F. For preliminary oxidation alloys may suitably be treated in air at a temperature in the range of about 1,500° to 1,700°F for a period of about 2 to 30 hours.

Before the oxidizing treatment the shaped alloy may be treated so as to remove chromium from the immediate vicinity of the surface. This is especially advantageous for Cr—Ni—Cu alloy of low Ni (less than about 20 or 25 percent Ni) and high Cr (more than about 25% Cr) levels. In a typical treatment, the alloy is washed with a mild acid, e.g., 20% HCl, which may be warmed, for example, to 40°C. Preferably, the acid is one which will not attack the nickel or copper in the alloy, but only the chromium at the surface. It has been found that Cr—Ni—Cu alloys containing greater than about 25% Cr treated in this way have high catalytic activity for the reduction of $NO_x$ and at the same time can withstand severe oxidizing atmospheres.

Metallographic examination of catalysts prepared in accordance with this invention shows the formation on the alloy of a surface region of up to about 10 to about 50 microns in thickness, composed of at least one of Cu, Ni, CuO, $Cu_2O$, NiO, $Cu_2Cr_2O_4$, $CuCr_2O_4$, $NiCr_2O_4$, and $Cr_2O_3$ and between the alloy and surface region an intermediate layer of about 1 to about 5 microns thickness of an oxide of chromium, e.g., $Cr_2O_3$, or $CuCr_2O_4$, which is stable to the environment under conditions where oxidation resistance is required. The surface region may consist of aggregates, mixtures or one or more layers of the various combinations. In this region there may be considerable variation in the porosity, depending at least in part on the manner in which the stratified layer is developed. The intermediate sub-surface layer is substantially continuous and dense. It is believed that this sub-surface layer protects the alloy from degratation in severe oxidizing atmospheres without completely preventing some migration of copper, nickel and chromium to the surface for regeneration of catalytically active species. However, if for example the $Cr_2O_3$ layer predominates at the surface, the material will not exhibit catalytic activity for the reactions under consideration except under very reducing conditions.

As noted above, the catalytic material can be used as particles, e.g., pellets, chips, spheres, rods, wire or sheet. If desired it can be used on a structural support or preform. In effect, however, the catalyst itself can be characterized as a monolithic structure which is developed from an alloy into a catalytic surface material on the alloy which serves as a support. Certain embodiments of this invention may also be further characterized by self-regeneration in that the inner alloy support material is available for further development into an active catalytic surface material.

The following illustrative examples are given for the purpose of providing those skilled in the art with a better understanding of the invention.

EXAMPLE 1

This example illustrates the preparation of catalyst pellets by hot consolidation from alloy powders prepared by a mechanical alloying or gas atomization method. The various steps in the preparation of the alloy pellets and subsequent treatments are identified on the typical preparations shown for the alloy 35Cr—13Ni—52Cu.

Powder A

An alloy powder is prepared by mechanical alloying by charging to a Szegvari attritor, 3,000 grams of metal powders consisting of 2,600 grams of a powder prepared by a gas atomization technique, composed of, by weight, 25Cr—15Ni—60Cu (minus 60 to plus 200 mesh) and 400 grams of chromium powder (plus 200 mesh). The powders are processed for 18 hours in the attritor with 70,000 grams of hardened steel balls at a speed of 288 rpm in an atmosphere of 2 psi argon. Thereafter, the powders are drained over a period of 2 hours.

Powder B

An alloy powder is prepared using essentially the same method set forth for powder A, except that the charge to the attritor is composed of elemental powders of chromium, nickel and copper in proportions to provide an alloy composed of 35Cr—13Ni—52Cu, the powders having the following particle size: minus 100 mesh chromium powder, minus 325 mesh nickel powder and minus 325 mesh copper powder.

Powder C

An alloy powder is prepared by inert gas atomization in which a 35 kg. charge consisting of chromium, nickel, and copper powders in amounts to give an alloy of the composition 35Cr—13Ni—52Cu is melted in an induction furnace in an evacuated chamber. The melt temperature is brought to about 2,900°F, that is superheated slightly (about 100°F) to ensure dissolution of all constituents in the bath. The melt is then poured into a heated tundish having a bottom orifice through which the metal flows and is impinged on by a jet of argon — which breaks the molten stream into fine particles. The particles solidify as they fall.

To form the pellets, the alloy powder is sealed in a steel can, compacted in an extrusion press at 1,800°F, and the resulting billet is extruded to 3/16 inch diameter rods, which are centerless ground to ⅛ inch diameter and cut to pellets 0.160 inch in length. The pellets are used as prepared or subjected to various preliminary etching and/or oxidation treatments as identified below.

| CATALYST TYPE | ALLOY POWDER | ACID ETCH | OXIDATION TREATMENT |
|---|---|---|---|
| A | A | No | Yes |
| B | B | No | Yes |
| C | B | No | No |
| D | B | Yes | Yes |
| E | C | No | Yes |
| F | B | Yes | No |

The acid etch treatment consisted of immersion of the pellets in a 20 percent aqueous solution of HCl for 20 minutes at 40° to 50°C. The oxidation treatment consisted of subjecting the material to an atmosphere of air at 1,500°F for 30 hours.

The catalyst materials described above were prepared as pellets for use in screening tests in connection with their use in synthetic exhaust. It will be appreciated that the alloy powders may be used to develop catalysts of different configurations and may be made using techniques other than hot consolidation. Also, the alloy powders may be used as a catalytic coating on a suitable substrate.

As noted above, a preliminary oxidation treatment is not required for all catalysts. For example, for use as an automobile exhaust catalysts, etched pellets prepared from 35Cr—13Ni—52Cu alloys and 25Cr—15Ni—60Cu can be activated directly in the exhaust stream without a preliminary oxidizing treatment. The materials develop the stratified oxide coating in the exhaust, however, it may be somewhat thinner than the oxide coating developed under the preliminary activation conditions described above.

The acid etch step described in connection with Catalyst D, is especially useful for catalysts prepared from alloy powders containing greater than about 25 percent chromium and less than 25 percent nickel.

EXAMPLE 2

This example shows the microstructure of a multiphase alloy composition of this invention prepared by mechanical alloying and the effect of an oxidation treatment thereon.

Samples were prepared of an alloy having the composition 35Cr—13Ni—52Cu in the form of pellets in accordance with the method shown for Catalyst Type F (no subsequent oxidation treatment) and Catalyst Type D (etching in 20 percent aqueous HCl at about 45°C for 20 minutes and treated in air at 1,500°F for 30 hours). Photomicrographs of the samples are shown in FIGS. 2a and 2b.

Figure 2A:
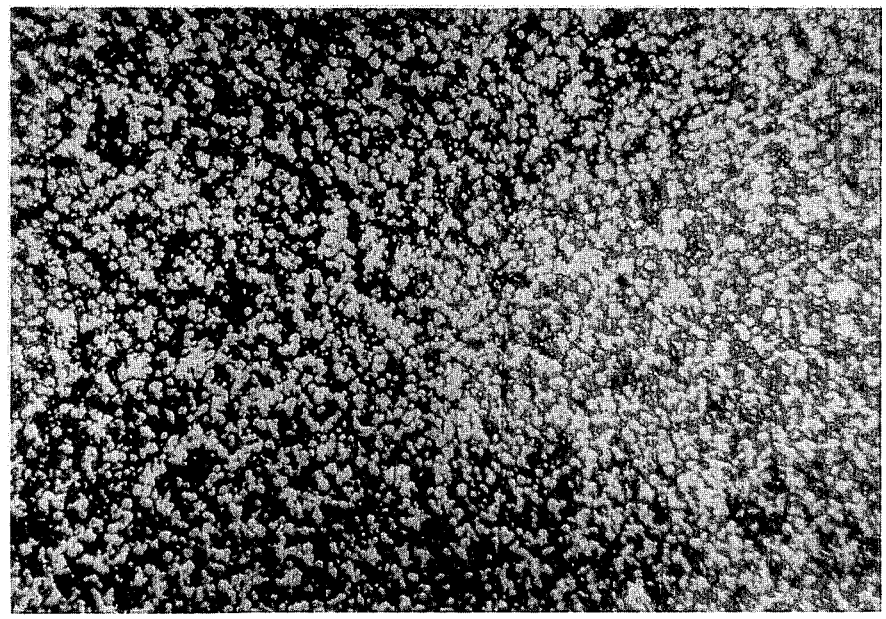
FIG. 2a is a photomicrograph at 1,000 × magnification of a catalyst of 35Cr—13Ni—52Cu, showing the uniform, fine composition and phase distribution which characterize the multiphase alloys of this invention.

FIG. 2a is a photomicrograph taken at 1,000 X magnification of the pellet prepared from an alloy powder having the 35Cr—13Ni—52Cu composition prepared by mechanical alloying. It shows the uniform fine dispersion of the chromium-rich alpha phase in a continuous matrix of a copper-rich gamma phase. The average distance between heterogeneities is not greater than about 5 microns. The figure shows the uniform distribution of heterogeneities over an area of about $2 \times 10^4$ square microns.

Figure 2B:
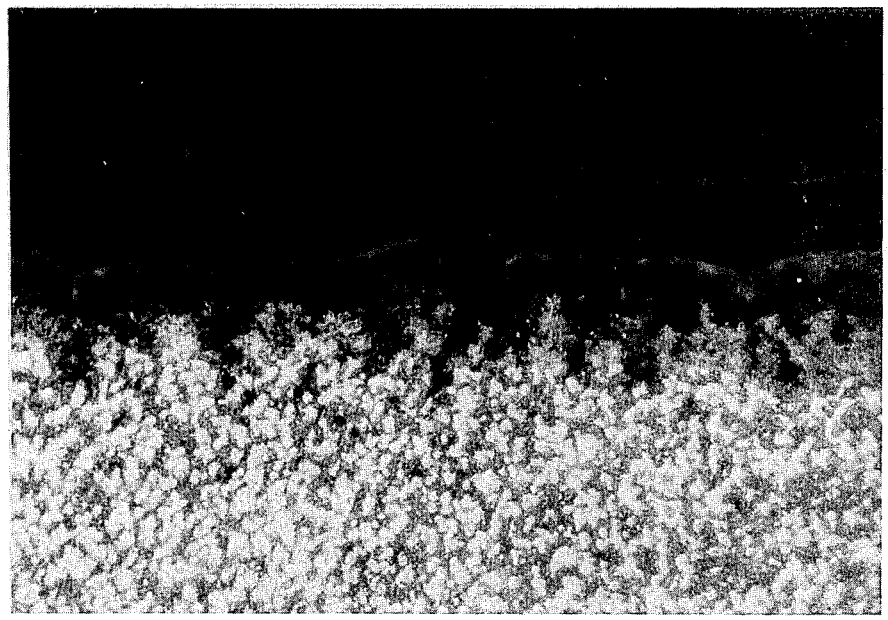
FIG. 2b is a photomicrograph at 1,000 × magnification of an alloy composition of this invention viz. 35Cr—13Ni—52Cu, which has been formed as a pellet from an alloy powder, etched, and then treated in air at 1,500°F for 30 hours.

FIG. 2b is a photomicrograph at 1,000 X magnification of a sample of the material subjected to the etching and oxidation treatment. It shows the stratification into a thin chromia layer of about 5 microns thickness adjacent to the alloy core and a surface region consisting of an outer layer of CuO and sub-layers containing one or more of copper, nickel, chromium oxides, and cuprous and cupric chromite. The core material, as in FIG. 2a, is essentially a uniform and fine dispersion of the chromium-rich alpha phase in the copper-rich gamma one matrix. The material is active for the catalytic reduction of nitrogen oxides, for the oxidation of CO and hydrocarbons and is oxidation-resistant.

EXAMPLE 3

Pellets were prepared from an alloy composition 15Cr—50Ni—35Cu using a method similar to the gas atomization method described for Catalyst E of Example 1. After being treated in a 20 percent aqueous HCl solution at 40°C for 20 minutes, the pellets are subjected to a temperature of 1,500°F for 30 hours in air. A stratified oxide scale developed similar to that shown in FIG. 2b in that the oxide is stratified into an outer region of CuO and sub-layers containing copper, nickel, chromium oxides, and cuprous chromite, and a thin chromium-rich intermediate layer of about 2–4 microns in thickness. The thin intermediate layer is $Cr_2O_3$ and/or a chromium containing mixed metal oxide. This material is active for the catalytic reduction of nitrogen oxides, for the oxidation of CO and hydrocarbons and it is oxidation resistant.

EXAMPLE 4

This example shows the effect of an oxidation treatment on a Cr—Ni—Cu material prepared in accordance with the present invention, one not falling within the composition boundary of FIG. 1 and the other falling just on the compsotion limit.

Samples were prepared by atomization and mechanical alloying, respectively, and hot consolidation using a method similar to that described in Example 1 but having the alloy compositions 15Cr—15Ni—70Cu and 53Cr—9Ni—38Cu, and including a treatment at 1,500°F in air for 30 hours. Samples were examined microscopically, and typical photomicrographs (1,000X magnification) are shown in FIGS. 3a and 3b.

Figure 3A:
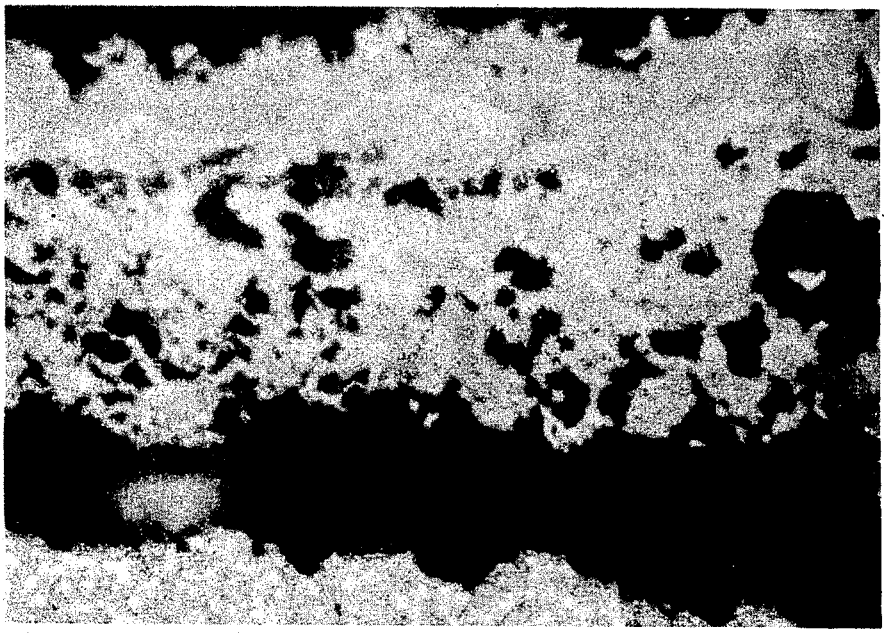
FIGS. 3a and 3b are photomicrographs at 1,000 × magnification of samples prepared from alloy powders and treated in air at 1,500°F for 30 hours, but having Cr—Ni—Cu compositions just on and outside the limits defined in FIG. 1. The sample of FIG. 3a has the alloy composition 15Cr—15Ni—70Cu, and the sample of FIG. 3b has the alloy composition 53Cr—9Ni—38Cu.
Figure 3B:
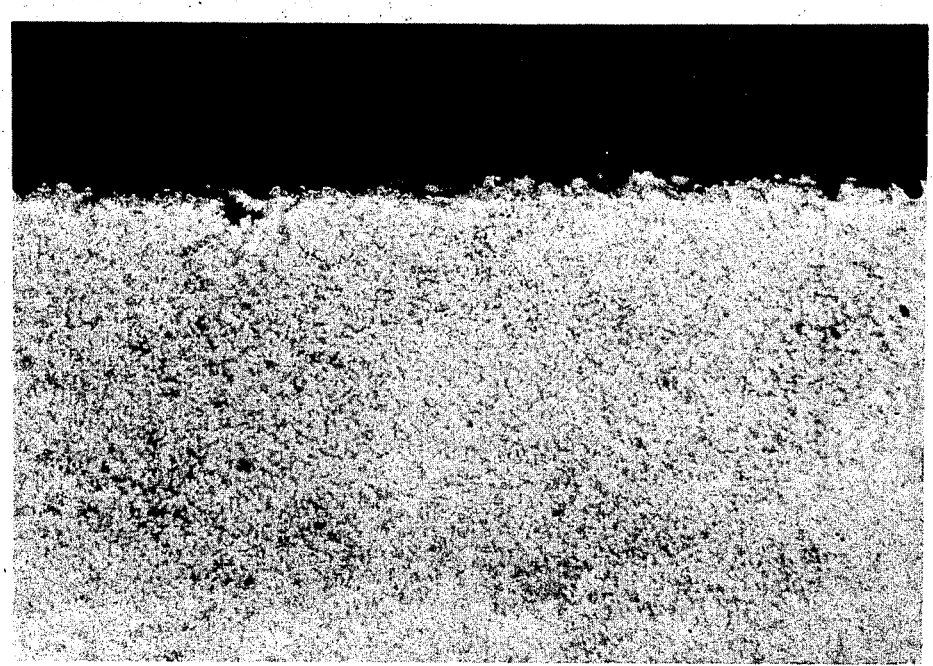

FIG. 3a, a photomicrograph of the alloy 15Cr—15Ni—70Cu, shows a thick oxide layer developed on the surfce of the alloy. This material is active but the thick oxide layer spalls easily. FIG. 3b, a photomicrograph of the 53Cr—9Ni—38Cu, shows a thin layer of $Cr_2O_3$ of approximately 2 microns thickness developed on the surface of the alloy. The thin oxide layer is adherent, but in this condition the material is not active for the reduction of $NO_x$ except under very reducing conditions.

EXAMPLE 5

This example shows catalytic characteristics of materials of this invention as catalysts for purifying a simplified synthetic auto exhaust stream. The test for evaluating the material is designed to simulate a first stage reactor of a dual-bed catalytic converter.

In a dual-bed system the exhaust gas usually passes sequentially through two beds with secondary air being introduced downstream of the first bed. The first bed is positioned so that at acceleration and cruising modes it is rapidly hot and it is reducing, and a $NO_x$ catalyst is used in such first bed. This system permits the exhaust stream at the time it contains the maximum $NO_x$ to contact the $NO_x$ reduction catalyst at high temperature and low $O_2$ level, conditions conducive to $NO_x$ reduction.

In the tests, 15 cc of catalyst in the form of pellets, 0.125 inch diameter by 0.165 inch long, were used in a fixed-bed downflow 0.8 inch diameter quartz reactor. The catalyst bed was approximately 1.8 inch deep. Gaseous feeds, simulating automobile exhaust, were prepared by mixing metered flows of the specific constituents. The inlet gas had a composition of, by volume, approximately 0.15% NO, 1.50% CO, 0.05% $C_3H_8$, 10.0% $CO_2$ 0–1.0% $O_2$, and the balance $N_2$. The gas feed was saturated to 10.0% $H_2O_{(v)}$. The oxygen content was varied from 0 to 1.0 percent at 1,300°F, then at 1,500°F, and again at 1,300°F so that the effect of the variation of $O_2$ level and temperature on the reactivity of the catalyst could be determined. (About 1.0% $O_2$ represents the stoichiometric amount required to oxidize all the CO and hydrocarbons in the stream.) The gaseous mixture was fed at an hourly space velocity of 10,000 to 100,000 V/V/hr (volumes of gas measured at standard temperature and pressure per volume of catalyst bed per hour).

The synthesized exhaust gas was preheated above the catalyst bed by passing through heated quartz wool or pieces of SiC, which have no catalytic effect on the gas stream.

The gas was analyzed for NO, $NO_2$ and for $NH_3$ using a Thermoelectron Model 10A Chemiluminescent Analyzer equipped with a gas dilution control. Analysis for $NH_3$ was supplemented by periodic checks using a wet chemical technique. Analysis of CO was done by a Beckman Model 315B NDIR Analyzer. The inlet oxygen was checked periodically using a mass spectrometer. The effluent NO, $NH_3$ and CO were recorded graphically. The catalyst composition preparation, and performance of typical tests run at a bed temperature of 1,300°F, and $O_2$ level of 0.5 and 0.75 percent and a space velocity of 40,000 V/V/hr are tabulated in TABLE II. The oxygen levels of 0.5 and 0.75 percent are believed to represent realistic operating levels for an engine running slightly rich. Data for $NH_3$ formation are reported at zero oxygen since $NH_3$ formation is maximum at this level. For the purpose of comparision the ease of activation by oxidation alone was rated, assigning the values 1 through 5. No. 1 being assigned to the catalysts activated with the least difficulty and No. 5 to those activated with the most difficulty. TABLE II also shows the relative durability of the alloys (except for quaternary alloys) based on the weight loss at 1,700°F experienced in synthetic exhaust atmospheres exposure, as described in Example 12. Relative durability is expressed as a rank from 1 to 15 with No. 1 having least weight loss and No. 15 having greatest weight loss.

Figure 4:
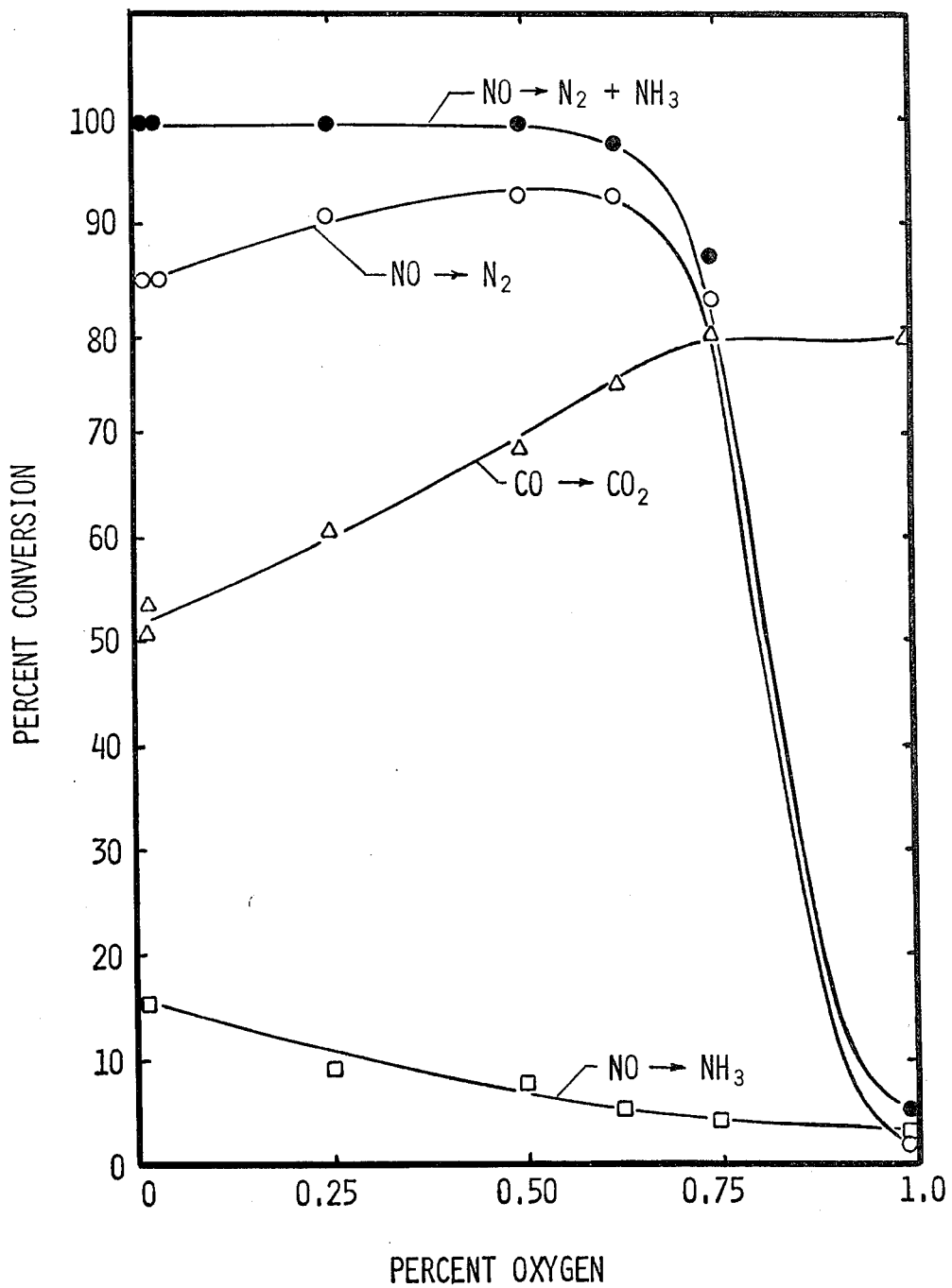
FIG. 4 is graph showing the $NO_x$ and CO removal from a simulated automobile exhaust stream using as the catalyst pellets of 35Cr—13Ni—52Cu prepared in accordance with this invention.

Table II shows that Cr—Ni—Cu catalysts prepared in accordance with this invention and having the alloy compositions: 25Cr—15Ni—60Cu, 35Cr—13Ni—52Cu, 15Cr—34Ni—51Cu, 25Cr—30Ni—45Cu, 15Cr—50Ni—35Cu are especially effective for selective reduction of $NO_x$ to $N_2$ and oxidation of CO to $CO_2$ and they are easily activated and durable. It will be noted that the catalytic profile with change in $O_2$ level showed that, generally, $NO_x$ reduction was favored by low $O_2$ concentration. FIG. 4 is a graph showing the $NO_x$ reduction to $N_2$ and to $NH_3$ and CO oxidation to $CO_2$ at $O_2$ concentrations from 0 to 1.0 percent in reactions run at a catalytic bed temperature of 1,300°F, a space velocity of 40,000 V/V/hr, using as catalyst pellets of the alloy 35Cr—13Ni—52Cu, prepared in accordance with the method shown for Catalyst D in Example 1. FIG. 4 illustrates that over a range of $O_2$ levels which would be present in automobile exhaust, especially in a first stage of dual-catalyst converter, the catalyst is useful for the conversion of NO to $N_2$ and CO to $CO_2$. Moreover the catalyst showed no signs of physical breakdown over a period of 50 hours.

EXAMPLE 6

Using a 35Cu—13Ni—52Cu alloy as catalyst pellets, prepared similarly to Catalyst D of Example 1, tests were run as described in Example 5, except that the space velocity was varied from 10,000 to 120,000 V/V/hr.

TABLE II

PERFORMANCE OF CATALYST PELLETS*

| % Composition | | | | % Conversion | | | | | | |
|---|---|---|---|---|---|---|---|---|---|---|
| Alloy | | | | NO → $N_2$ | | $NH_3$ | CO → $CO_2$ | | Ease of | Relative |
| Cr | Ni | Cu | OTHER | 0.5 | 0.75 | 0 | 0.5 | 1.0 | Activation | Durability |
| 15 | 0 | 85 | | 67 | 71 | 82 | 79 | 76 | 1 | 14 |
| 25 | 0 | 75 | | 65 | 47 | 57 | 67 | 63 | 1 | 12*** |

TABLE II – Continued

PERFORMANCE OF CATALYST PELLETS*

| % Composition | | | | | % Conversion | | | | | | |
|---|---|---|---|---|---|---|---|---|---|---|---|
| Alloy | | | | | NO → N₂ | | NH₃ | CO → CO₂ | | Ease of | Relative |
| Cr | Ni | Cu | OTHER | | 0.5 | 0.75 | 0 | 0.5 | 1.0 | Activation | Durability |
| 35 | 0 | 65 | | | 60 | 43 | 74 | 67 | 60 | 2 | 5 |
| 45 | 0 | 55 | | | 87 | 75 | 20 | 63 | 75 | 5 | 4 |
| 15 | 15 | 70 | | | 84 | 72 | 24 | 73 | 79 | 1 | 11 |
| 25 | 15 | 60 | | | 90 | 71 | 15 | 73 | 90 | 2 | 6 |
| 35 | 13 | 52 | | | 94 | 93 | 13 | 74 | 92 | 3 | 2 |
| 45 | 11 | 44 | | | 93 | 93 | 16 | 78 | 94 | 5 | 1 |
| 15 | 34 | 51 | | | 91 | 91 | 13 | 78 | 93 | 1 | 10 |
| 25 | 30 | 45 | | | 93 | 63 | 13 | 85 | 95 | 1 | 9 |
| 35 | 26 | 39 | | | 88 | 63 | 17 | 66 | 68 | 4 | 3*** |
| 15 | 50 | 35 | | | 93 | 15 | 11 | 77 | 94 | 1 | 7 |
| 0 | 70 | 30 | | | 96 | 90 | 5 | 74 | 83 | 1 | 8 |
| 0 | 67 | 30 | | | N.D. | N.D. | N.D. | N.D. | N.D. | — | 13 |
| 0 | 0 | 100 | | | 23 | 3 | 30 | 46 | 48 | — | 15 |
| ~18 | ~8 | 0 | Bal | Fe** | 1 | 1 | 13 | 21 | 17 | — | — |
| 35 | 13 | 47 | 5 | Fe | 91 | 87 | 15 | 78 | 91 | 3 | — |
| 35 | 13 | 51 | 1 | La₂O₃ | 94 | 61 | 12 | 78 | 91 | 5 | — |
| 34 | 13 | 52 | 1 | Co | 89 | 88 | 29 | 80 | 94 | 3 | — |
| 34 | 13 | 52 | 1 | Pb₃O₄ | 92 | 74 | 1 | 67 | 79 | 1 | — |

*Catalyst Type D except for 70Ni-30Cu prepared as pellets from a vacuum melt heat drawn to rod and 67Ni-30Cu prepared as pellets from commercial Monel rod.
**304 stainless steel.
***Estimated
N.D.=No data As contemplated, $NO_x$ reduction decreased with increase in space velocity. However, it was found that even at 100,000 V/V/hr, $NO_x$ reduction was about 80 percent at an $O_2$ level of 0.5 percent, even when the catalyst is in pellet form.

EXAMPLE 7

Using a 25Cr—15Ni—52Cu alloy, catalysts were prepared to demonstrate the effect of a physical configuration. (This is illustrated further in Example 9). For this purpose, alloy chips were machined from a billet of consolidated atomized powder. For comparison pellets of this same alloy were prepared. Both forms were etched prior to testing but were not subjected to a preliminary oxidation treatment. Samples of each catalyst were used in tests described in Example 5. A 15cc catalyst bed containing 5 grams of chips having an estimated geometric surface area of 252 sq. cm. gave 92, 92 and 50 percent conversion of NO to $N_2$ at 0.25, 0.50, and 0.75 percent oxygen levels respectively. A 15cc catalyst bed of about 60 grams of pellets having an estimated geometric surface area of 136 sq. cm. resulted in only 86, 30, and 0 percent conversions of NO to $N_2$ at the same oxygen levels. Preoxidation treatment would further improve the activity of each form.

EXAMPLE 8

Using a 35Cu—13Ni—52Cu alloy catalyst prepared as pellets in accordance with Catalyst D of Example 1, tests were run to determine the reproducibility of the catalytic activity. The tests were run at temperatures of 1,300° and 1,500°F., and at space velocity of 40,000 V/V/hr. The results are tabulated in TABLE III.

TABLE III

Reproducibility of 35Cr-13-Ni-52-Cu Alloy Catalyst
Catalyst Activity at 1300°F.

| %Oxygen Catalyst | →0 | NO → N₂ | | | CO → CO₂ | | | NH₃ |
|---|---|---|---|---|---|---|---|---|
| | | 0.25 | 0.25 | 0.75 | 0 | 0.50 | 1.0 | 0 |
| C-1 | 82 | 83 | 86 | 87 | 52 | 73 | 81 | 18 |
| C-2 | 88 | 92 | 85 | 79 | 34 | 63 | 84 | 12 |
| C-3 | 90 | 95 | 90 | 77 | 46 | 67 | 87 | 10 |
| C-4 | 87 | 94 | 94 | 89 | 55 | 78 | 92 | 13 |
| C-5 | 90 | 93 | 85 | 8 | 55 | 84 | 95 | 12 |
| C-6 | 82 | 88 | 86 | 13 | 59 | 80 | 90 | 18 |

Catalyst Activity at 1500°F.

| C-1 | 95 | 96 | 97 | 97 | 41 | 65 | 85 | 5 |
| C-2 | 99+ | 96 | 65 | 40 | 25 | 48 | 62 | 0 |
| C-3 | 99+ | 99 | 43 | 11 | 33 | 48 | 65 | 0 |
| C-4 | 99 | 99 | 98 | 97 | 33 | 61 | 85 | 1 |
| C-5 | 99 | 98 | 75 | 18 | 53 | 73 | 90 | 1 |
| C-6 | 95 | 97 | 97 | 55 | 50 | 70 | 73 | 5 |

The results in TABLE III show that the performance of six similarly prepared catalysts were especially consistent at the low $O_2$ levels, activity being higher for both NO to $N_2$ (without $NH_3$ formation) and CO to $CO_2$ at 1,500° than at 1,300°F. At the higher $O_2$ levels, although less consistent for NO reduction, the catalyst was very active for both reactions.

EXAMPLE 9

This example shows catalytic characteristics of two alloys of this invention used to purify a synthetic auto exhaust stream. This test is similar to that of Example 5 except for the composition of the inlet gas stream which was varied to represent exhaust for engine operation at various air fuel ratios (AFR values). The inlet gas compositions are based on an assumed fuel of $C_8H_{17}$ for which stoichiometric combustion occurs at an AFR of 14.7. Catalysts were tested at 1,300°F at space velocities of 40,000 to 160,000 V/V/hr. The catalyst identified as D-1 is a pelleted material prepared substantially as described for Catalyst D of Example 1 from a 35Ci—13Ni—52Cu alloy. Catalyst D-2 is prepared from 35Ci—13Ni—52Cu but is deposited on expanded metal mesh. Catalyst D-3 is a material prepared similarly to Catalyst D-2 but from 15Ci—50Ni—35Cu alloy.

Table IV shows that Cr—Ni—Cu catalyst prepared in accordance with this invention and having alloy compositions 35Cr—13Ni—52Cu and 15Cr—50Ni—35Cu are effective for the selective reduction of $NO_x$ to $N_2$ at AFR values just rich of stoichiometric combustion. At lower AFR values more $NH_3$ was formed (as at lower oxygen concentrations in Example 5). Higher $NH_3$ concentrations are observed in this example than in Example 5 because the oxidation potential is lower and hydrogen availability is higher. Where objectionable, $NH_3$ formation could be further reduced by injection of a small quantity of air into the exhaust, operating at a higher temperature, and/or selecting an alloy having higher Ni content as illustrated by the data of Table IV.

wise similar conditions, and that more efficient distribution of the catalyst, results in improved activity.

It will be noted that the catalysts shown in Table IV are also effective for oxidation of CO and hydrocarbons (HC) under various conditions. Moreover, if the hydrocarbons are unsaturated as represented by propylene ($C_3H_6$) of Table IV rather than saturated as represented by propane ($C_3H_8$), the catalysts are especially active for oxidation under both oxidizing (AFR>14.7) and reducing (AFR<14.7) conditions. Actual auto exhaust contains a mixture of saturated and unsaturated hydrocarbons and hence conditions exist for which the catalysts of this invention appear applicable for useful conversion of NO, CO and HC simultaneously.

EXAMPLE 10

This example shows the results of test performed using a prototype 1976 V-8 engine of 405 cubic inch displacement with a compression ratio of about 8:1. The engine was equipped with ceramic exhaust manifold and post-manifold-reactor liners to avoid catalytic interference which might occur with conventional metallic parts.

Catalyst beds of the 35Cr—13Ni—52Cu and 15Cr—50Ni—35Cu alloy, deposited an expanded metal mesh, were tested at about 1,300°F and 120,000

TABLE IV

CATALYTIC PURIFICATION OF SYNTHETIC AUTO EXHAUST
% Conversion at Various AFR

| Catalyst D-1 at 1300°F. and 40,000 V/V/hr | | | | | | | |
|---|---|---|---|---|---|---|---|
| AFR | 13.0 | 13.5 | 14.0 | 14.5 | 14.7 | 15.0 | 15.5 |
| NO (to $N_2$) | 41 | 54 | 82 | 95 | 9 | 2 | — |
| NO (to $NH_3$) | 59 | 60 | 18 | 5 | 5 | — | — |
| CO | ~30 | 30 | 41 | 73 | 85 | 81 | — |

| Catalyst D-1 at 1300°F. and 80,000 V/V/hr | | | | | | | |
|---|---|---|---|---|---|---|---|
| AFR | 13.0 | 13.5 | 14.0 | 14.5 | 14.7 | 15.0 | 15.5 |
| NO (to $N_2$) | 44 | 56 | 79 | 58 | 0 | 0 | — |
| NO (to $NH_3$) | 56 | 44 | 17 | 8 | 0 | — | — |
| CO | — | — | 19 | 49 | 45 | 50 | — |

| Catalyst D-2 at 1300°F. and 80,000 V/V/hr | | | | | | | |
|---|---|---|---|---|---|---|---|
| AFR | 13.0 | 13.5 | 14.0 | 14.5 | 14.7 | 15.0 | 15.0 |
| NO (to $N_2$) | 57 | 61 | 70 | 87 | 0 | 0 | 0 |
| NO (to $NH_3$) | 43 | 39 | 30 | 5 | 0 | 0 | 0 |
| CO | ~44 | 38 | 37 | 78 | 87 | 80 | 60 |
| $C_3H_8$ | 52 | 40 | 39 | 28 | 42 | 46 | 88 |

| Catalyst D-2 at 1300°F. and 80,000 V/V/hr | | | | | | | |
|---|---|---|---|---|---|---|---|
| AFR | 13.0 | 13.5 | 14.0 | 14.5 | 14.7 | 15.0 | 15.5 |
| NO (to $N_2$) | 60 | 62 | 73 | 90 | 2 | 0 | 0 |
| NO (to $NH_3$) | 40 | 38 | 27 | 9 | 0 | 0 | 0 |
| CO | — | 35 | 32 | 77 | 85 | 81 | 73 |
| $C_3H_6$ | 96 | 95 | 94 | 91 | 74 | 84 | 93 |

| Catalyst D-3 at 1300°F. and 80,000 V/V/hr | | | | | | | |
|---|---|---|---|---|---|---|---|
| AFR | 13.0 | 13.5 | 14.0 | 14.5 | 14.7 | 15.0 | 15.5 |
| NO (to $N_2$) | 74 | 81 | 89 | 80 | 0 | 0 | 0 |
| NO (to $NH_3$) | 26 | 19 | 12 | 7 | 0 | 0 | 0 |
| CO | 45 | 39 | 36 | 81 | 87 | 80 | 59 |
| $C_3H_8$ | 60 | 45 | 40 | 16 | 18 | 40 | 98 |

The results in Table IV show that increasing space rate results in slightly decreased activity under otherwise V/V/hr. space velocity. The catalyst beds compatable with the exhaust system were only 27 cubic inches in volume and weighed about 500 grams. Because the catalyst volume was small with respect to the engine size, the engine was operated at the rather slow speed of about 1,500 rpm to provide exhaust flow and temperatures considered realistic for catalyst operation. Air fuel ratios were varied between about 13.0 and 15.0; torque and ignition timing were controlled to obtain the desired steady state exhaust gas mass flow and temperature. To provide $NO_x$ levels of about 1,000 ppm in the exhaust, NO was injected in the intake manifold.

The results of these tests showed minimum peak net efficiencies for conversion of $NO_x$ to $N_2$ of roughly 65 and 80 percent at about 1,300°F and 120,000 V/V/hr space velocity, respectively, for the 35Cr—13Ni—52Cu and 15Cr—50Ni—35Cu alloys. The lower conversion level for the 35Cr—13Ni—52Cu alloy was due to its slightly higher $NH_3$ formation. Additionally, these levels of activity were maintained for the entire operating period which was about 115 hours. This is estimated to be equivalent to about 5,000 miles of driving.

EXAMPLE 11

Various compositions prepared in the form of cylinders of 0.300 inch diameter 0.750 inch length, using a method similar to that shown for Catalyst E of Example 1, were subjected to an oxidation resistance screening test by temperature cycling every 24-hours in an air-5 percent moisture atmosphere. The 24-hour temperature cycle consisted of a 23-hour exposure to a temperature of 1,700°F followed by a 1-hour cool to room temperature in still air. The samples were weighed initially and at the 24-hour intervals. Prior to weighing, the specimens are tapped against a hard surface to knock-off any loose or moderately loose oxide scale.

The results showed oxidation resistance in this atmosphere to be largely a function of the copper content of the alloy with minor exceptions. Weight losses were only 14 and 13 percent, respectively for 35Cr—13Ni—52Cu and 15Cr—50Ni—35Cu alloys in 500 hours.

Samples of commercial Monel, alloy 400 (a product of The International Nickel Company Inc.) were subjected to the screening test for oxidation resistance. The results showed greater than 100 percent weight loss in 500 hours. A vacuum melted 70Ni—30Cu alloy also showed greater than 100 percent weight loss in this period.

Samples of the composition 25Cr—15Ni—60Cu were prepared by:
1. blending and consolidating "coarse" elemental powders, i.e., plus 100 mesh,
2. blending and consolidating "fine" elemental powders, i.e., minus 325 mesh,
3. atomizing and consolidating powder, i.e., comparable to Catalyst E of Example 1, but not pre-oxidized,
4. mechanically alloying and consolidating powder, i.e., comparable to Catalyst C of Example 1.

Blending refers to mechanical mixing of the powders and "consolidation" refers to the compaction in a steel can at elevated temperature, as described in Example 1.

A comparison of results of the tests for those materials formed by simply blending powders with those prepared with this invention represented by gas atomization and mechanical alloying is shown in TABLE V. The results show the greater oxidation resistance of the materials of this invention.

With respect to the multi-phase alloy material it is believed that if the heterogeneity spacing is too great, i.e. greater than about 20 microns, this prevents the formation of a chromium-rich layer which is substantially continuous and, thus protective. Also it is believed that the formation of a chromium-rich layer which is substantially continuous is not liable to be formed where the heterogeneities are coarse, i.e. greater than about 20 microns, and/or non-uniformly distributed in the alloy system.

TABLE V

| TYPE PREP. | Alpha-Chromium Size (Microns) | % Weight loss in 240 hours (10 cycles) |
|---|---|---|
| Coarse powder blending | ~ 120 | 90.0% |
| Fine powder blending | ~ 25 | 69.7% |
| Gas atomization | ~ 8 | 49.1% |
| Mechanical alloying | ~ 1.5 | 29.1% |

EXAMPLE 12

Various materials, prepared in the form of cylinders 0.300 inch diameter by 0.750 inch length using the method of Catalyst E of Example 1, were subjected to an atmosphere of synthetic exhaust gas for a period of 448 hours under a cycle which consisted of placing the specimen in a tube furnace, maintaining it at a temperature of 1700°F, for 16 hours, and withdrawing it slowly so as to cool it in the synthetic exhaust atmosphere. A subsequent cycle was run with the same temperature profile, however the $O_2$ content of the synthetic gas was changed. The gas mixture was composed of 1,500 ppm NO, 1.50% CO, 0.05% $C_3H_8$, 10% $CO_2$, 0.25% and 1.5% $O_2$, and the balance $N_2$, saturated to a 10% $H_2O$ content. The CO equivalent, i.e., CO + $C_3H_8$, in the synthetic gas mix was equal to 2.0%, for which stoichiometric $O_2$ was 1.0%.

Weight losses of 0.04 and 4.4% were found for 35CR—13Ni—52Cu and 15Cr—50Ni—35Cu alloys, respectively. Commercial and vacuum melted composition of about 70Ni—30Cu showed weight losses of 77% and 46%, respectively. In general, the resistance to degradation was found to be a function of the chromium content of the alloy.

EXAMPLE 13

This example demonstrates the activity of a catalyst in accordance with this invention for oxidation of CO and hydrocarbons.

Alloy pellets having the composition 35Cr—13Ni—52Cu were prepared substantially according to the method described for Catalyst D of Example 1. The pellets were screened for catalytic activity for the oxidation of CO in an atmosphere composed of 0.15% NO, 1.5% CO, 0.05% $C_3H_8$, 10% $CO_2$, 2.5% $O_2$ and the balance $N_2$, saturated to 10% $H_2O$, at space velocity of 40,000 V/V/hr. On raising the temperature of the catalyst bed at a rate of between 12° and 15°F/minute, a 50% conversion of CO was reached at 545° or 610°F, depending on whether the prior use of the catalyst had been under oxidizing or reducing conditions respectively.

At a temperature of 1,300°F in the aforementioned atmosphere; conversion of CO to $CO_2$ was found to be about 90%. Additionally, conversion of the $C_3H_8$ hydrocarbon was found to be about 66%. However, if the unsaturated hydrocarbon, propylene, was substituted for $C_3H_8$ in this test, the hydrocarbon conversion was about 84 percent. The type of hydrocarbon was also observed to affect the hydrocarbon conversion during warm up of the catalyst bed: propylene conversion closely followed CO conversion while propane conversion trailed behind, requiring higher temperatures. The activity of this catalyst for oxidation of CO under less favorable conditions in so far as the $O_2$ content of the stream is illustrated in Example 5.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

TABLE VI

| Inlet Gas Composition, % | | | | Reaction Onset Temp., $T_1$,°F. | 50% NO Conv., Temp., $T_2$,°F. | Steady State Characteristics | | | | |
|---|---|---|---|---|---|---|---|---|---|---|
| | | | | | | Bed Outlet Temp., $T_4$,°F. | Bed Inlet Temp., $T_3$,°F. | Outlet Gas | | Net NO Conv., % |
| NO | $O_2$ | $H_2O$ | Fuel | | | | | NO PPM | $NO_2$ or $NH_3$ PPM | |
| A. Low Oxygen Inlet Gases | | | | | | | | | | |
| 0.30 | 0 | 3.0 | 0.6-CO | 400 | 670 | 1000 | ~990 | 25 | 275 | 89 |
| 0.30 | 0 | <0.3 | 0.6-CO | — | — | 1000 | ~990 | ~5 | 0 | 99 |
| 0.30 | 0 | 3.0 | 0.6-$H_2$ | — | — | 1000 | 985 | ~5 | 1040 | 64 |
| B. Inlet Gases Containing Oxygen | | | | | | | | | | |
| 0.30 | 2.0 | 3.0 | 4.6-CO | 385 | 970 | 1000 | ~580 | 1850 | 90 | 38 |
| 0.30 | 2.0 | <0.3 | 4.6-CO | 295 | 935 | 1000 | ~500 | 200 | 0 | 93 |
| 0.30 | 2.0 | 3.0 | 4.6-$H_2$ | 550 | 900 | 1000 | 580 | ~5 | 645 | 77 |
| 0.30 | 2.0 | <0.3 | 4.6-$H_2$ | 450 | ~750 | 1000 | 550 | ~5 | 550 | 81 |
| C. Effect of Temperature & Fuel Level on $NH_3$ Control | | | | | | | | | | |
| 0.30 | 2.0 | 3.0 | 4.0-$H_2$ | — | — | 1000 | ~560 | 675 | 105 | 73 |
| 0.30 | 2.0 | 3.0 | 4.0-$H_2$ | — | — | 1100 | — | 150 | 60 | 92 |
| 0.30 | 2.0 | 3.0 | 4.0-$H_2$ | — | — | 1200 | 900 | 50 | 0 | 98 |
| 0.30 | 2.0 | 3.0 | 4.6-$H_2$ | — | — | 1200 | — | ~5 | 225 | 92 |
| 0.30 | 2.0 | 3.0 | 4.4-$H_2$ | — | — | 1200 | — | ~5 | 75 | 97 |
| 0.30 | 2.0 | 3.0 | 4.2-$H_2$ | — | — | 1200 | 900 | ~5 | 40 | 98.5 |
| 0.30 | 2.0 | 3.0 | 3.8-$H_2$ | — | — | 1200 | 905 | 1200 | 50 | 56 |

EXAMPLE 14

This example illustrates the activity of a catalyst of this invention for the reduction of oxides of nitrogen using various fuels.

The tests were performed on a simulated nitric acid plant tail gas stream, typically compound of 0.3% NO + $NO_2$, 2.0% $O_2$, 1.0% $H_2O$ and the balance $N_2$. In addition to the tests were run with no $O_2$ to evaluate reduction activity directly and also with $H_2O$ content at less than 0.3 percent. The fuels included $H_2$, CO, $C_3H_8$, and $CH_4$. The catalyst was prepared in accordance with this invention from a gas atomized powder essentially in accordance with the method given for Catalyst E, except that instead of forming pellets the gas atomized powder is deposited on an expanded mesh screen as disclosed in the aforementioned co-pending application.

The tests were run at a space velocity of 60,000–70,000 V/V/hr and temperature measurements and gas inlet and outlet analyses were made to determine the steady state response at several temperatures and the ignition temperature at which reactivity was detected.

Under the conditions tested, CO and $H_2$ are superior fuels to hydrocarbons. Typical results with $H_2$ and CO are tabulated in TABLE VI.

The data in TABLE VI show that the catalyst is effective for purifying a stream containing NO when contacted, at an elevated temperature, with such stream in the presence of a fuel which provides a reducing atmosphere.

From the foregoing description it is clear that the catalysts of the present invention are useful not only for purification of automobile exhaust but also for reduction of nitrogen oxides, oxidation of carbon monoxide, oxidation of hydrocarbons, and formation of ammonia in the absence of oxygen.

What is claimed is:

1. As a catalyst material, an alloy in the form of a powder of uniform composition consisting essentially of (A) chromium and copper or (B) chromium, nickel and copper, said alloy powder being or capable of being on heat treatment substantially free of optically observable heterogeneities of a size greater than about 20 microns, said composition (A) consisting essentially of about 15 to about 45 percent chromium and the balance essentially copper, and said composition (B) consisting essentially of about 5 to about 50 percent chromium, about 5 to about 60 percent nickel, and the balance essentially copper, said chromium, nickel and copper components being correlated as defined by the area falling within the boundary A-B-C-D-E-A of FIG. 1.

2. An alloy powder for use as a catalyst material according to claim 1, wherein said alloy is substantially a single phase system.

3. An alloy powder for use as a catalyst material according to claim 1, wherein said alloy is substantially a multi-phase system having a matrix phase and heterogeneities consisting essentially of at least one phase different from the matrix phase, the heterogeneities being no greater in size than about 20 microns and the average distance between such heterogeneities being less than about 20 microns.

4. An alloy powder for use as a catalyst material according to claim 1, wherein the powder has a density equal to at least 80 percent of the theoretical density.

5. An alloy powder for use as a catalyst material according to claim 1, wherein the alloy consists essentially of about 15 to about 45 percent chromium and the balance essentially copper.

6. An alloy powder for use as a catalyst material according to claim 1, wherein the chromium, nickel and copper components of the composition (B) are correlated as defined by the area falling within the boundary F-G-H-I-F of FIG. 1.

7. An alloy powder for use as a catalyst material according to claim 1, wherein the alloy consists essentially of about 15 to about 45 percent chromium, about 10 to about 60 percent nickel, and the balance essentially copper.

8. An alloy powder for use as a catalyst material according to claim 1, wherein the alloy consists essentially of about 25 to about 35 percent chromium, about 5 to about 30 percent nickel, and the balance essentially copper.

9. An alloy powder for use as a catalyst material according to claim 1, wherein the alloy consists essentially of about 15 to about 25 percent chromium, about 25 to about 60 percent nickel, and the balance essentially copper.

10. An alloy powder for use as a catalyst material according to claim 1, wherein the alloy contains up to about 15 percent iron, up to about 10 percent cobalt, up to about 10 percent molybdenum, up to about 10 percent manganese, said iron, cobalt, molybdenum and manganese totaling up to not more than about 20 percent, and as minor additives up to about 5 percent each of La, Y, Ce, Ba, Ag, Li, Pb, V, Sn, Si, platinum group metals, and oxides of La, Y, Pb, Ba, Li, said minor additives totaling up to about 10 percent.

11. An alloy powder for use as a catalyst material according to claim 2, wherein the chromium, nickel and copper composition is further defined in that it is bounded on the left by the boundary W-X-Y-Z of FIG. 1.

12. An alloy powder for use as a catalyst material according to claim 3, wherein the chromium, nickel and copper composition is further defined in that it is bounded on the right by the boundary W-X-Y-Z of FIG. 1.

13. An alloy powder for use as a catalyst material according to claim 11 having a composition consisting essentially of about 15 percent chromium, about 50 percent nickel and the balance essentially copper.

14. An alloy powder for use as a catalyst material according to claim 12 having a composition consisting essentially of about 35 percent chromium, about 13 percent nickel, and the balance copper.

15. An alloy powder for use as a catalyst material according to claim 1, wherein the alloy is a multi-phase system having a microstructure comprising a chromium-rich phase finely and uniformly distributed throughout a copper-rich phase.

16. A catalyst especially useful for the treatment of waste gases containing nitrogen oxides comprised of an alloy having a chromium-nickel-copper composition consisting essentially of about 15 percent to about 50 percent chromium, about 5 percent to less than 25 percent nickel, and the balance essentially copper, said chromium, nickel and copper components being correlated as defined by the area falling within the boundary A-B-C-D-E-A of FIG. 1.

17. A catalyst according to claim 16, wherein the chromium, nickel and copper components are correlated as defined by the area falling within the boundary F-G-H-I-F of FIG. 1.

18. A catalyst according to claim 16, wherein the alloy contains about 25 to about 35 percent chromium.

19. A catalyst according to claim 16, wherein the alloy consists essentially of about 35 percent chromium, about 13 percent nickel and the balance essentially copper.

20. A catalyst according to claim 16, wherein the alloy consists essentially of about 25 percent chromium, about 13 percent nickel, about 12 percent iron and the balance essentially copper.

21. A monolithic catalyst comprised of a core, a catalytically active, stratified surface region on at least part of said core, and an intermediate layer between the core and the surface region, said core comprising an alloy consisting essentially of (A) chromium and copper or (B) chromium, nickel and copper, the composition of said alloy (A) consisting essentially of about 15 percent to about 45 percent chromium and the balance essentially copper, and the composition of said alloy (B) consisting essentially of about 5 to about 50 percent chromium, about 5 to about 60 percent nickel, and the balance essentially copper, said chromium, nickel and copper components being correlated as defined by the area falling within the boundary of A-B-C-D-E-A of FIG. 1, said surface region consisting essentially of at least one of the group Cu, Ni, CuO, $Cu_2O$, NiO, $Cu_2Cr_2O_4$, $NiCr_2O_4$, $CuCr_2O_4$, and $Cr_2O_3$, and said intermediate layer being thin, substantially continuous and consisting essentially of a chromium-rich material, said surface region and intermediate layer being developed directly on the core from the alloy by a method comprising treating the alloy at an elevated temperature in a gas phase atmosphere which is oxygenating with respect to said alloy.

22. A monolithic catalyst according to claim 21, wherein the surface region is up to about 10 to about 50 microns in thickness and the intermediate layer is up to about 1 to about 5 microns in thickness.

23. A monolithic catalyst according to claim 21, wherein the intermediate layer is substantially chromia.

24. A monolithic catalyst according to claim 21, wherein the intermediate layer consists essentially of at least one chromium containing oxide.

25. A monolithic catalyst according to claim 21, wherein the stratified surface region has an outer layer comprising copper.

26. A method of preparing a catalytic material comprised of chromium and copper or chromium, nickel and copper comprising:
 a. providing an alloy of said metals in the form of a powder, said alloy powder being or capable of being on heat treatment either:
  A. substantially a single phase system substantially free of heterogeneities of a size greater than about 20 microns, or
  B. a multi-phase system having a matrix phase and heterogeneities consisting essentially of at least one phase different from the matrix phase distributed in such structure, the heterogeneities being no greater in size than about 20 microns and the average distance between such heterogeneities being less than about 20 microns, and
 b. treating the alloy at an elevated temperature in a gas phase atmosphere which is oxygenating with respect to said alloy to develop an oxidation resistant, stratified, catalytically active surface on the alloy.

27. A method of preparing a catalytic material according to claim 26, wherein the alloy powder is formed into a shaped macrostructure and the macrostructure is treated according to step (b) to develop the stratified catalytically active surface thereon.

28. A method of preparing a catalytic material according to claim 26, wherein the alloy powder is provided by a mechanical alloying technique, an atomization technique, or a combination thereof.

29. A method of preparing a catalytic material according to claim 26, wherein the gas phase atmosphere is selected from the group consisting of air, air enriched with moisture, nitrogen containing oxygen.

* * * * *